(12) United States Patent
Yundt, Jr.

(10) Patent No.: US 6,477,846 B2
(45) Date of Patent: Nov. 12, 2002

(54) BIMETALLIC TUBE IN A HEAT EXCHANGER OF AN ICE MAKING MACHINE

(75) Inventor: Albert P. Yundt, Jr., Springfield, MO (US)

(73) Assignee: Paul Mueller Company, Springfield, MO (US)

( * ) Notice: Subject to any disclaimer, the term of this patent is extended or adjusted under 35 U.S.C. 154(b) by 0 days.

(21) Appl. No.: 09/992,151

(22) Filed: Nov. 6, 2001

(65) Prior Publication Data

US 2002/0035847 A1 Mar. 28, 2002

Related U.S. Application Data

(62) Division of application No. 09/637,452, filed on Aug. 11, 2000, now Pat. No. 6,318,094.

(51) Int. Cl.[7] ................................................. F25C 1/14
(52) U.S. Cl. .............................. 62/71; 62/354; 165/94
(58) Field of Search ....................... 62/71, 354; 165/94, 165/133; 236/102

(56) References Cited

U.S. PATENT DOCUMENTS

| 2,386,747 A | | 10/1945 | Ris |
| 2,792,180 A | | 5/1957 | Flagg |
| 3,726,475 A | | 4/1973 | Eising |
| 3,960,208 A | * | 6/1976 | Anthony et al. ............. 165/133 |
| 4,023,557 A | * | 5/1977 | Thorne et al. ............... 126/661 |
| 4,296,612 A | | 10/1981 | Allo |
| 4,348,794 A | | 9/1982 | Kim et al. |
| 4,452,302 A | | 6/1984 | Schoerner |
| 4,551,159 A | | 11/1985 | Goldstein |
| 4,796,441 A | | 1/1989 | Goldstein |
| 4,827,734 A | | 5/1989 | Buus |
| 4,846,264 A | * | 7/1989 | Hata ............................ 138/145 |
| 4,899,813 A | | 2/1990 | Menicatti et al. |
| 5,221,439 A | | 6/1993 | Li et al. |
| 5,363,660 A | | 11/1994 | Li et al. |
| 5,385,645 A | | 1/1995 | Li |
| 5,513,698 A | | 5/1996 | O'Hanlon |
| 5,597,036 A | | 1/1997 | O'Hanlon |
| 5,884,501 A | | 3/1999 | Goldstein |
| 5,953,924 A | * | 9/1999 | Li et al. ................... 165/109.1 |
| 6,056,046 A | | 5/2000 | Goldstein |
| 6,142,216 A | | 11/2000 | Lannes |

FOREIGN PATENT DOCUMENTS

| EP | 0 831 290 A2 | 8/1997 |
| WO | WO 97/34101 | 3/1997 |
| WO | WO 99/50610 | 3/1999 |
| WO | WO 99/62654 | 5/1999 |
| WO | WO 01/07846 A1 | 7/2000 |

* cited by examiner

*Primary Examiner*—William E. Tapolcai
(74) *Attorney, Agent, or Firm*—Thompson Coburn LLP

(57) ABSTRACT

A heat exchanger tube in a heat exchanger for an ice making machine includes a bimetallic heat exchanger tube to improve capacity and wear characteristics of the heat exchanger. The heat exchanger tube has an outer portion with a first material composition and an inner portion with a second material composition where the first material composition is different from the second material composition. The first material composition is compatible with the refrigerants used in the heat exchanger unit of the ice making machine. The second material composition is compatible with the feed solution being chilled in the heat exchanger tube.

15 Claims, 3 Drawing Sheets

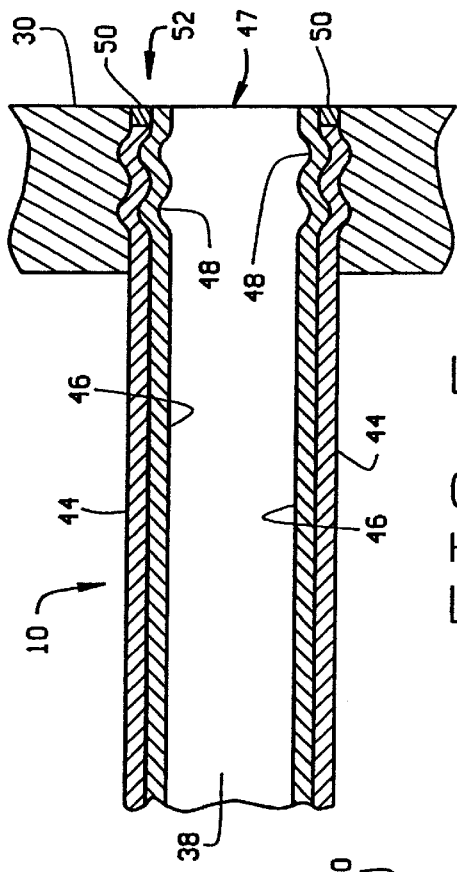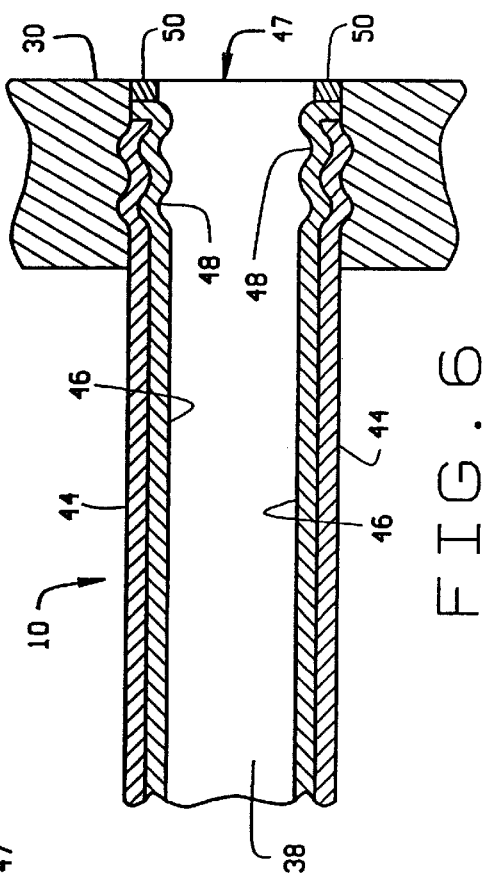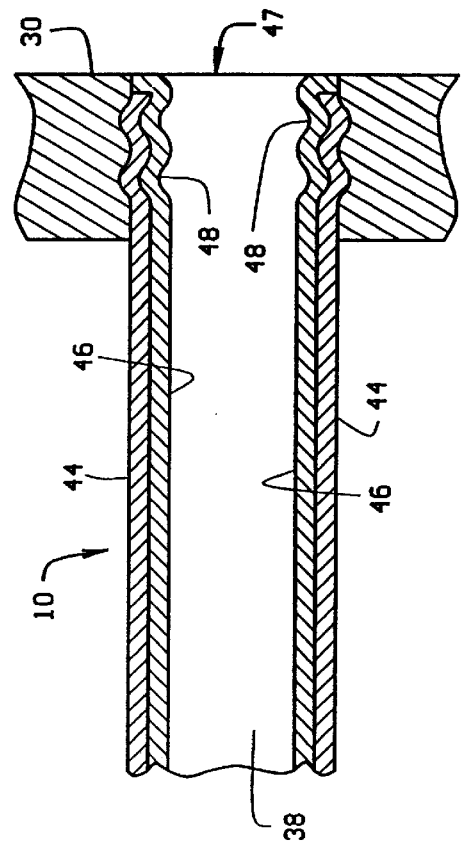

BIMETALLIC TUBE IN A HEAT EXCHANGER OF AN ICE MAKING MACHINE

RELATED APPLICATION DATA

This application is a divisional of application Ser. No. 09/637,452, filed Aug. 11, 2000, now U.S. Pat. No. 6,318,094."

BACKGROUND OF THE INVENTION

(1) Field of the Invention

The present invention relates to heat exchanger tubes for heat exchangers used in chilling fluids or making ice. Specifically, the invention relates to an improvement in the heat exchangers where a bimetallic heat exchanger tube is used to increase the capacity of the heat exchanger and lower the rate of wear of other parts within the heat exchanger.

(2) Description of the Related Art

Heat exchangers for making a chilled fluid or water-ice mixture are well known in the art. These heat exchangers are used in a variety of industries including the food processing industry where a slurry ice mixture is used to refrigerate meats, produce, and fish. The heat exchangers are also used in the processing of milk products and concentrated fruit juices, and in HVAC and brewing applications. In these heat exchangers, the ice water mixture is pumped through heat exchanger tubes and refrigerant is circulated around the tubes. The fluid mixture is chilled as it passes through the heat exchanger tubes, and the chilled mixture is pooled in a reservoir where it may be accumulated for further processing, as required. In order to prevent ice from forming in the tube and adhering to the tube, mechanical agitators are used to maintain the flow of the chilled mixture-through the heat exchanger.

One machine that has gained wide use in the food processing industry is a whip rod heat exchanger. A typical whip rod heat exchanger has vertical heat transfer tubes with whip rods positioned in the heat transfer tubes. Feed or process solution is directed into the tubes. A drive mechanism in the heat exchanger develops relative motion between the tubes and the whip rods to distribute the feed solution evenly within the tube, thus more effectively freezing or chilling the feed solution. An orbital tube evaporator system is described in U.S. Pat. No. 5,221,439, issued Jun. 22, 1993, and entitled Orbital Tube Evaporator With Improved Heat Transfer. An improvement to that apparatus is described in U.S. Pat. No. 5,385,645, issued Jan. 31, 1995, and entitled Heat Transfer Apparatus with Positive Drive Orbital Whip Rod, the disclosures of which are incorporated herein by reference. In the orbital whip rod system described in the '645 patent, the feed solution is pumped through the vertical tubes and chilled by the refrigerant circulating in the chamber surrounding the vertical heat exchanger tubes. The whip rod moves in an orbital direction inside a stationary heat exchanger tube so that the fluid is distributed as a film on the inner diameter surface of the tube. The whip rod creates a turbulent flow liquid layer that prevents the feed solution from sticking to the inner wall of the tube as it is chilled and moves from the top of the heat exchanger to the bottom of the heat exchanger. The refrigerant is circulated around the outside of the heat transfer tube to remove heat from the feed solution to chill the feed solution. The chilled feed solution may then be directed from the bottom of the vertical tubes to a storage tank where it may be pumped away or otherwise utilized as required by the application.

An improvement to the orbital whip rod heat exchanger is described in U.S. Pat. No. 5,953,924, issued Sep. 21, 1999, and entitled Apparatus, Process and System for Tube and hip Rod Heat Exchanger, the disclosure-of which is incorporated herein by reference. The '924 patent describes an invention where the orbital whip rod heat exchanger may be configured to operate in a flooded tube mode where the heat exchanger tubes are flooded with process fluid and the whip rod is driven from both ends of the heat exchanger tube, and a falling film mode, where the heat exchanger tube is partially filled with process fluid and the whip rod is suspended in the tube and driven from a drive plate above the tube.

Another style of heat exchanger for producing an ice-slurry mixture found in wide spread use in the food processing industry is a heat exchanger with flooded refrigerated tubes having a rotating blade inside the tube. These heat exchangers are described in U.S. Pat. No. 5,884,501 issued Mar. 23, 1999, and U.S. Pat. No. 6,056,046, issued May 2, 2000, the disclosures of which are hereby incorporated by reference. The ice slurry mixture is formed in a central tube in a heat exchanger housing and is moved from an inlet to an outlet in the central tube by a rotating blade. Refrigerant is circulated in refrigerant tubes formed around the outer periphery of the heat exchanger housing. The rotating blades move past the inner wall of the central tube of the heat exchanger without contacting it and thereby move cooled fluid from the surface to prevent the deposition of ice crystals on the inner wall of the heat exchanger.

In these conventional heat exchangers, including the orbital whip rod heat exchanger, the tubes are generally made from stainless steel since stainless steel is both corrosion resistant to the feed solution being pumped through the inner wall surfaces of the tube and the refrigerant which circulates around the outer wall surfaces of the heat exchanger tube. Stainless steel also has good thermal conductivity and good strength. In stainless steel tube heat exchangers, HCFC and ammonia may be used as refrigerants in a variety of applications where the chilled feed solutions may include seawater and food products. Copper has also been used for constructing the heat exchanger tubes; however, copper is generally not compatible with ammonia based refrigerant systems. In industries where there is a higher concern for safety, HCFC refrigerants continue to be used. On the other hand, in process cooling applications, ammonia based refrigerants are well suited because of their low cost and high efficiency. As stainless steel tubes can be used in both the systems, stainless steel heat exchanger tube systems are common.

However, stainless steel heat exchanger tube systems have many disadvantages. Stainless steel tube heat exchangers are generally more expensive when compared to copper tube heat exchangers. In the construction of copper tube or stainless steel tube heat exchangers, the tubes are generally roll fastened to the tube sheet. The tube to tube sheet connection must be a leak tight boundary to prevent the refrigerant from leaking out of the heat exchanger unit and into the feed solution and possibly the surrounding workspaces. Since ammonia is toxic, in some applications that use ammonia as a refrigerant, the stainless steel tube must be welded to the tube sheet in addition to being roll fastened to ensure the required leak tight boundary for the application. Since copper tube exchangers do not use ammonia, the tube to tube sheet connection need only be roll fastened, thus lowering manufacturing cost. Stainless steel also generally has a higher material cost than copper.

In these types of heat exchangers, seamless stainless steel tube is preferred. A welded tube may also be used if the weld bead is flattened to provide a smooth transition over the seam. In the orbital rod heat exchanger, the smooth inner surface of the tube allows the whip rod to travel along the inner surface without "bumping" or jumping over the seam. The consistent motion of the whip rod creates the turbulent flow layer needed to prevent ice formation in the tube. In the blade type heat exchanger, the smooth surface is required so that the small radial clearance between the blades and the inner surface of the tube is maintained for fluid flow along the inner surface of the tube. A more costly seamless tube or the secondary operation of flattening the weld bead is an added expense. Since copper tubes are usually drawn without a seam when manufactured, they are generally less expensive than seamless stainless steel tubing.

Stainless steel heat exchanger tubes also have other drawbacks when compared to conventional copper-based systems. In order to depress the freezing point of solution as it is processed and promote the formation of ice slurry, additives such as ethylene glycol, propylene glycol, urea, and ethanol may be added. These substances when used in the feed solution cause the ice crystals of the feed solution to form as small flakes or as powdery solids rather than large, flat flaky crystal structures. The powdery consistency of the ice particles prevents the feed solution from adhering to the inner wall surfaces of the heat exchanger tube. Other corrosion inhibiting substances such as di-potassium phosphate ($K_2 HPO_4$) are also commonly added.

Although the additives enhance the formation of the ice slurry mixture in the tubes, the use of these additives in the feed solution tends to accelerate corrosion and wear of components in the heat exchanger. Specifically, the eccentrics and tube inserts in the drive mechanism for positioning and driving the whip rod in the tube are made from hardened steel materials. This difference in materials in the presence of the feed solution accelerates corrosive attack on these drive components. In an orbital rod heat exchanger having a stainless steel tube construction, the tube inserts and eccentrics are most anodic. Because these parts generally have a small surface area, they are highly susceptible to galvanic corrosion. As tube inserts and eccentrics corrode, their surfaces grow rough, and the hardened, roughened surfaces contribute to accelerated wear of the other components in the drive mechanism such as the plastic counter crank, plastic sleeve bearing, and whip rod.

The attack tends to be more acute when the concentration of corrosion inhibiting agents in the feed solution is low. To slow the corrosion, the concentration of the additives must be maintained relatively high. Generally, phosphate must be maintained at a level of at least 1000 ppm, and preferably 4000 ppm, in order to prevent corrosion. The level of additives must be periodically monitored to prevent deterioration of the system. Additionally, certain areas in the drive system experience a combination of corrosion and erosion from suspended solids in the feed solution. In order to prevent this type of rapid wear, secondary filtration system are commonly installed on ice making machines with stainless steel heat exchanger tubes. This also adds cost to the machine.

In addition to the higher manufacturing costs and wear problems found with stainless steel tube heat exchangers, ice making machines using stainless steel tubes generally have a lower ice making capacity when compared to ice making machines with heat exchangers using copper tubes.

SUMMARY OF THE INVENTION

In order to solve these and other problems in the prior art, the inventor has succeeded in designing a heat exchanger tube that is an improvement to the heat exchanger tubes of the prior art. The heat exchanger tube of the present invention increases the capacity of ice making machines using stainless steel heat exchanger tubes and improves the wear characteristics of other components in the heat exchanger.

The present invention is an improvement to the heat exchanger tubes used in conventional ice making machines that produce an ice-water slurry mixture. The heat exchanger tube has an outer portion that is formed from a first material composition, and an inner portion that is formed from a second material composition. The outer and inner portions of the heat exchanger tube are integrally joined to create a one-piece tube. The outer portion of the tube may be made from a carbon steel, austenitic stainless steel, martensitic stainless steel, or aluminum. The inner portion of the tube may be made from copper, copper-nickel, or brass materials, depending on the feed solution being processed in the heat exchanger. The outer portion of the tube is compatible with a wide range of refrigerants, and the inner portion permits a higher heat flux through the heat exchanger tubes to increase the capacity of the ice-making machine.

The heat exchanger tube of the present invention may be used in a wide variety of heat exchangers including a whip rod heat exchanger. When the heat exchanger tube is installed in a whip rod heat exchanger, the inner portion of the heat exchanger tube is preferably seamless to allow smooth relative motion between the whip rod and the heat exchanger tube. Additionally, the inner portion of the heat exchanger tube preferably has a low galvanic potential when compared to other components in the heat exchanger when these components are in the presence of the feed solution. This allows the inner portion of the heat exchanger tube to act as a sacrificial anode with the other components in the heat exchanger, specifically the drive components which produce the orbital relative motion between the tube and whip rod, to prevent corrosion of these components and reduce wear.

In forming the heat exchanger tube of the present invention, the outer portion of the heat exchanger tube preferably takes the form of an outer cylindrical sleeve and the inner portion takes the form of an inner cylindrical sleeve. The inner cylindrical sleeve is fitted within the bore of the outer cylindrical sleeve. The outer cylindrical sleeve may be drawn over the inner cylindrical sleeve such that the two sleeves are joined together by a mechanical interference fit. A third thermally conductive material, such as a thermal mastic or grease, may be used to decrease the thermal resistance between the inner and outer cylindrical sleeves.

The outer cylindrical sleeve may also take the form of a cladding that is wrapped around the inner cylindrical sleeve such that the outer diameter surface of the inner cylindrical sleeve is substantially covered by the outer cladding. In this arrangement, the outer cylindrical sleeve may be formed by rolling a flat stock material around the outer diameter surface of the inner cylindrical sleeve. A third material, such as a brazing material or other compound capable of joining the outer and inner cylindrical sleeves, may be interposed between the inner and outer sleeves and in the area between the two ends of the rolled flat stock material to form a metallurgical bond between the outer cladding and the inner sleeve. Similarly, the inner cylindrical sleeve may be formed from an inner cladding that is applied to the bore of the outer cylindrical sleeve. The outer or inner cladding may also take the form of a coating attached to the respective inner or outer diameter surfaces of the heat exchanger tube through an electrochemical, flame spray, or plasma coating process. In each case the cladding layer and tube are compatible with the refrigerant or feed solution being used in the heat exchanger, and the thermal resistance between the cladding layer and the tube is minimized.

While the principal advantages and features of certain specifics of the preferred embodiments have been explained above, a greater understanding of the invention may be obtained by referring to the drawings and detailed description of the preferred embodiment which follow.

BRIEF DESCRIPTION OF THE DRAWING FIGURES

FIG. 5 is an alternative embodiment of FIG. 4 showing the heat exchanger tube attached to the tube sheet of the heat exchanger;

FIG. 6 is an alternative embodiment of FIG. 4 showing the heat exchanger tube attached to the tube sheet of the heat exchanger; and FIG. 7 is an alternative embodiment of FIG. 4 showing the heat exchanger tube attached to the tube sheet of the heat exchanger.

Corresponding reference characters indicate corresponding part throughout the several views of the drawings.

DETAILED DESCRIPTION OF THE PREFERRED EMBODIMENT

Figure 1:
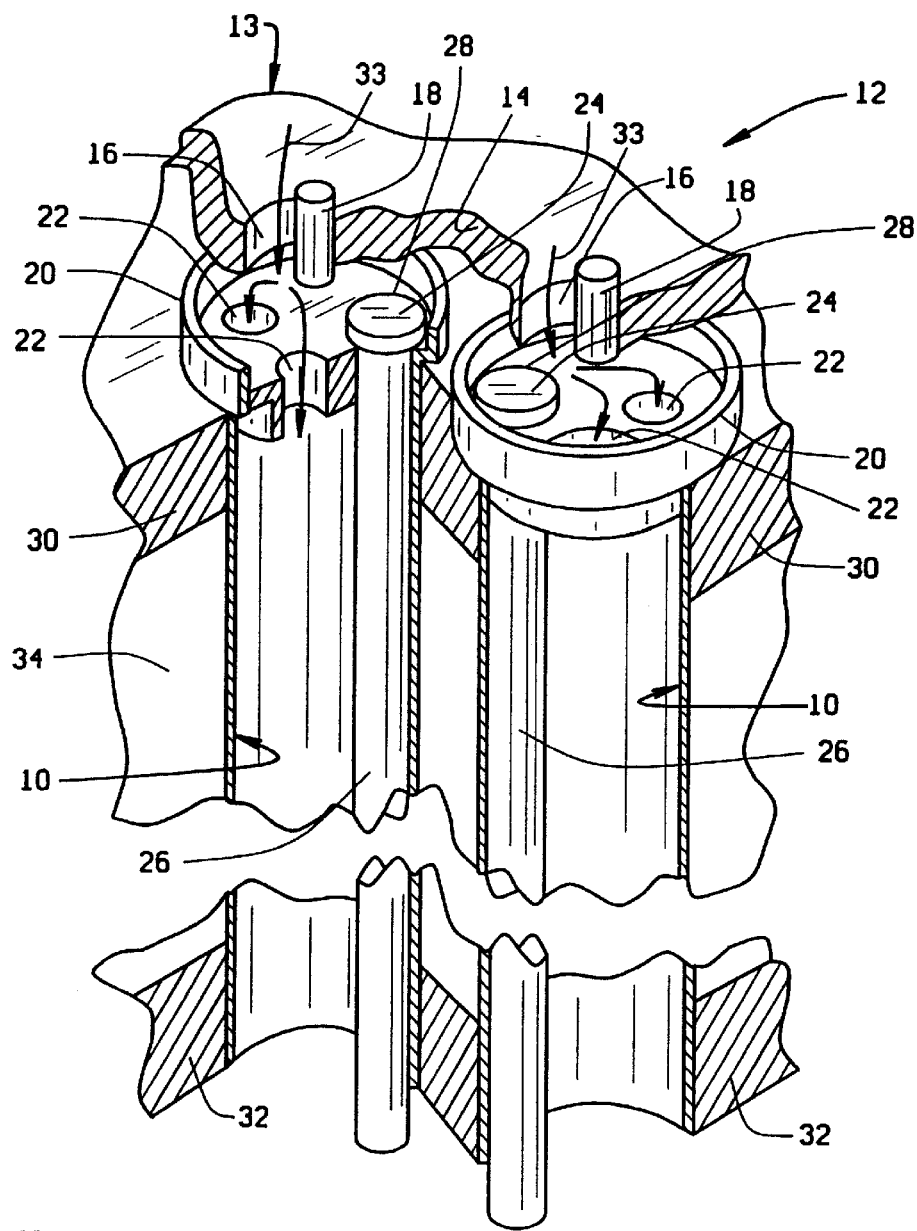
FIG. 1 is a partial, perspective view of a typical heat exchanger in which the heat exchanger tube of the present invention is used.

The bimetallic tube 10 of the present invention is used in a heat exchanger 12, such as the orbital whip rod freezer shown in FIG. 1. It should be understood that the orbital rod freezer is one type of ice making machine to which the present invention may be applied. The bimetallic tube 10 of the present invention may also be used in the heat exchanger units of other ice making machines as an improvement to the capacity and wear characteristics of the heat exchanger unit. As shown in FIG. 1, the heat exchanger unit 12 of the orbital whip rod freezer has several drive components 13 including a drive plate 14 having a plurality of drive holes 16 which are matched to interfit with a plurality of drive pins 18. Each of the drive pins 18 is connected to a counter crank 20 and the counter crank 20 has a feed orifice 22 and a whip rod hole 24 through which a whip rod 26 is supported by an annular flange 28 at its upper end. Each whip rod 26 is inserted into the heat exchanger tube 10. The tubes 10 are held in place and fixed in a spaced relationship by an upper and lower tube sheet 30,32. The feed solution flows through the drive holes 16 in the drive plate 14 and onto the top of the counter crank 20 where the liquid accumulates before it enters through the feed orifice hole 22 and into the interior of the heat exchanger tube 10. The direction of flow of the feed solution is indicated at reference numerals 33. As the whip rod 26 is driven in an orbital motion around the interior of the tube 10, the whip rod 26 spreads the feed solution in a thin film around the interior of the heat exchanger tube 10 to enhance chilling of the feed solution. A refrigerant is circulated in an interior space 34 between the tube sheets 30,32 and around the exterior surfaces of the tubes 10. The refrigerant removes heat from the feed solution, chilling the solution so that as the solution flows through the tubes 10, an ice-water mixture or slurry exits the bottom of the tubes 10.

Figure 2:
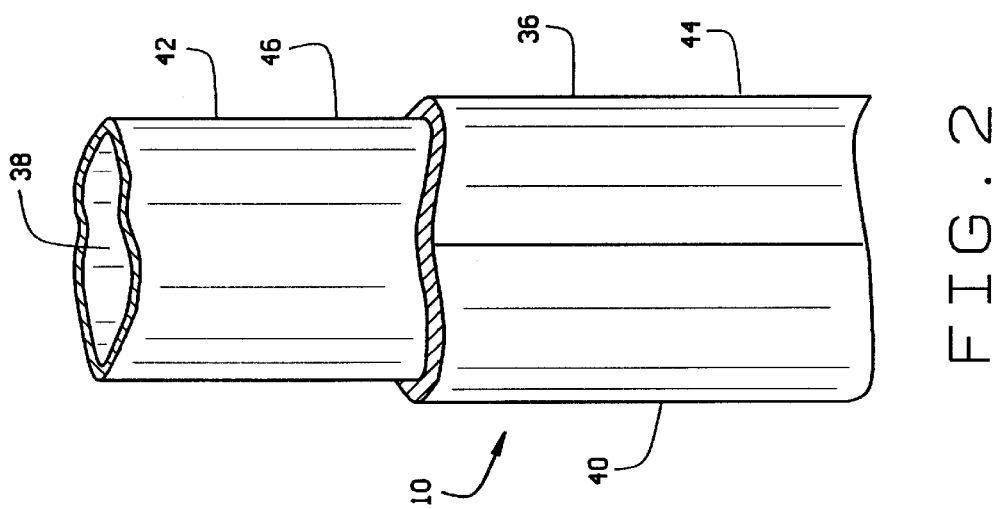
FIG. 2 is a partial, front elevational view of the heat exchanger tube of FIG. 1.

FIG. 2 provides greater detail of the heat exchanger tube 10 of the present invention. The tube 10 is arranged in the heat exchanger-where the refrigerant circulates around an outer wall surface 36 of the tube 10 and the feed solution flows through an inner wall surface 38 of the tube. The tube 10 has an outer portion 40 which forms the outer wall surface 36 and has a first material composition. The tube 10 has an inner portion 42 which forms the inner wall surface 38 of the tube 10 and has a second material composition. The first material composition of the outer portion 40 of the heat exchanger tube is different from the second material composition of the inner portion 42.

In the preferred embodiment of the invention, the first material composition of the outer portion 40 of the heat exchanger tube 10 preferably resists corrosion by the refrigerant and provides sufficient thermal conductivity through the wall of the heat exchanger tube 10. The second material composition of the inner portion 42 of the heat exchanger tube also has good thermal conductivity properties while being compatible with the feed solution of the particular application of the heat exchanger 12. The inner portion 42 also reduces corrosive attack on other drive components 13 when the feed solution is present in the heat exchanger 12.

In the preferred embodiment of the heat exchanger tube 10, the outer portion 40 is preferably made from an austenitic 304 stainless steel material. Carbon steel and aluminum are also suitable materials since they are compatible with ammonia based refrigerants. Martensitic stainless steels such as AISI 410 or AISI 420 may also be used to form the outer portion 40 of the heat exchanger tube 10. When constructing the inner portion 42 of the heat exchanger tube 10, copper based alloys such as copper 122, or copper 194 may be used. Additionally, copper nickel alloys may be used as copper nickel alloys have a superior corrosion resistance to sea water. Copper nickel 706 has been found to be an acceptable material in this particular type of application. Leaded brass and other brass materials have also been found to be suitable for forming the inner portion of the heat exchanger tube. Specifically, brass 330 and brass 270 generally have good resistance to oxidation in industrial, rural, and marine atmospheres.

As shown in FIG. 2, the outer portion 40 of the heat exchanger tube is formed as an outer cylindrical sleeve 44, and the inner portion 42 is formed as an inner cylindrical sleeve 46. The inner cylindrical sleeve 46 is fitted within the bore of the outer cylindrical sleeve 44. Thus, the heat exchanger tube 10 may take the form of a first, outer tube or pipe with a second, inner tube or pipe fitted concentrically within the bore of the first, outer tube or pipe. To minimize material costs of forming the tube 10, the outer cylindrical sleeve 44 may take the form of a welded tube while the inner cylindrical sleeve 46 may take the form of drawn tube. The drawn tube is preferred since it will provide a smooth surface on the inner wall 38 of the heat exchanger tube 10. The smooth surface provides consistent motion for the whip rod and even dispersion of the feed solution to prevent ice formation on the inner walls of the tube. Preferably, the tube 10 is made by drawing the inner cylindrical sleeve 46 through the bore of the outer cylindrical sleeve 44 thus attaching the sleeves 44,46 by a mechanical interference fit. For a tube 10 having an outer diameter of 1½ inches, a tube wall of between 0.035"–0.065" inches is preferred. In this construction, each of the tube walls of both the inner and outer cylindrical sleeves 44,46 is approximately 1/64 inches to 1/32 inches thick. In a typical orbital whip rod heat exchanger, the heat exchanger tube measuring 1½ inches on its outer diameter is generally four feet long.

Figure 3:
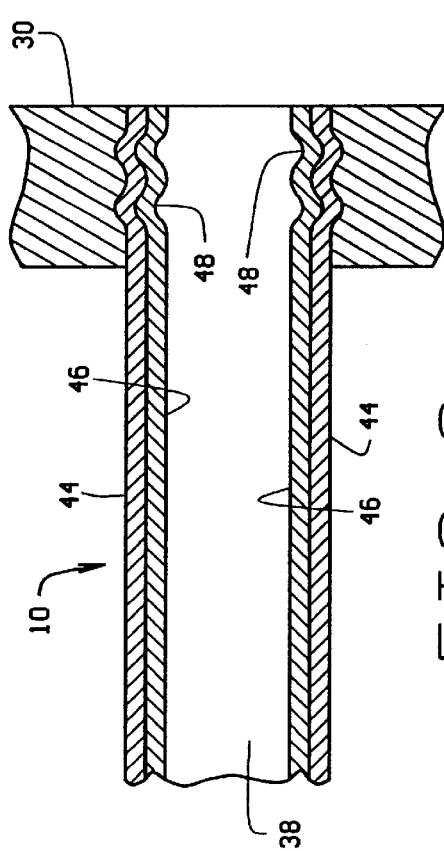
FIG. 3 is a cross-sectional view of the heat exchanger tube attached to a tube sheet of the heat exchanger.
Figure 4:
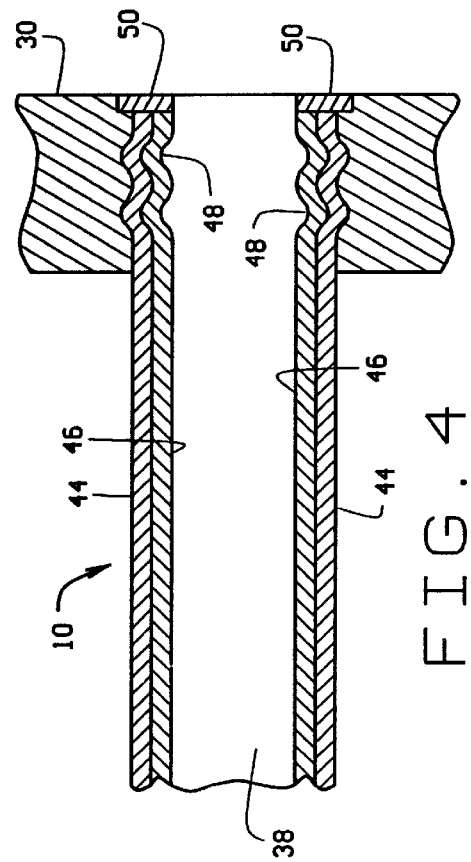
FIG. 4 is an alternate embodiment of FIG. 3 showing the heat exchanger tube attached to the tube sheet of the heat exchanger.

FIGS. 3 through 7 show preferred methods of attaching the tube 10 to the upper tube sheet 30 of the heat exchanger 12. Although not shown in the Figures, this method is also used on the lower tube sheet 32. Depending upon the application, the tube 10 may be rolled into a tube hole 47 in the tube sheets 30,32 using common practices in the art. Generally, the roll attachment or roll fastening 48 as shown in FIG. 3 provides a leak tight boundary between the refrigerant and the feed solution. Depending upon the application, a welded or brazed joint 50 may also be used in conjunction with a roll fastened connection 48. FIG. 4 shows the roll fastened tube to tube sheet connection 48 and the brazed connection 50. The brazed connection 50 secures and protects the outer cylindrical sleeve 44 from corrosive attack from the feed solution or the additives that may be present in the feed solution. For instance, brazing may be used to protect the exposed end of a carbon steel outer cylindrical sleeve 44 from corrosion by the glycol solution that may be added to the feed solution to promote slurry formation. The heat exchanger tube may also be welded to the tube sheets 30,32. However, this process is costly as each tube in the heat exchanger must be welded individually. Since brazing can be done in a batch operation such as in a furnace brazing operation, brazing the heat exchanger tube 10 provides an inexpensive way to protect exposed ends of the heat exchanger tube 10 while providing the necessary leak protection found in welding.

FIGS. 5, 6, and 7 show alternative methods of attaching the tube 10 to the tube sheet 30. In each of these arrangements, the outer cylindrical sleeve 44 is cut back from the distal end of the tube 10 approximately 3/16 inches to 3/8 inches to expose the outer diameter surface of the inner cylindrical sleeve 46. Cutting back the outer cylindrical sleeve 44 in this manner forms an annular groove 52 on the distal end of the tube 10 between the inner cylindrical sleeve 46 and the tube hole 47. In FIG. 5, the brazing material or weld material 50 is deposited in the annular groove 52 where it covers the exposed end of the outer cylindrical sleeve 44 and bonds the tube 10 to the tube sheet 30. FIG. 6 shows a similar arrangement of the outer cylindrical sleeve 44. In this case, the distal end of the inner cylindrical sleeve 46 is peened over the exposed end of the outer cylindrical sleeve 44 to cover the exposed end of the outer cylindrical sleeve 44. The weld material 50 is then deposited between the tube sheet 30 and the peened over portion of the inner cylindrical sleeve 46. FIG. 7 shows an alternate method of covering the exposed end of the outer cylindrical sleeve 44 where the inner cylindrical sleeve 46 is peened over the exposed end of the outer cylindrical sleeve 44 to form a seal with the inside surface of the tube hole 47.

The bimetallic tube 10 of the present operation provides a substantial increase in capacity while reducing wear of drive system components. By using copper as a material for the inner cylindrical sleeve 46, the heat exchanger 12 has a higher capacity than heat exchangers using stainless steel tubes. Additionally, the inner cylindrical sleeve 46 acts as a sacrificial anode in the presence of the feed solution with the hardened steel materials that are used to fabricate the drive components 13 of the heat exchanger 12. This prevents corrosive attack on the hardened steel drive components 13 and promotes longer life. This increase in wear life may be achieved by using less or no additional additives to the feed solution. With the outer cylindrical sleeve 44 constructed from the stainless steel, a wide variety of refrigerants can be used in the heat exchanger 12. As steel and stainless steel are both resistant to corrosion in the presence of ammonia, low temperature cooling may be achieved. Because the outer cylindrical sleeve 44 does not form the inner diameter surface of the heat exchanger tube and does not contact the whip rod 26, the outer cylindrical sleeve 44 may be made from less expensive forms of material, such as a welded tube.

In an alternative embodiment of the invention, the outer cylindrical sleeve may be formed from a tube shaped member that substantially covers the outer diameter surface of the inner cylindrical sleeve. In this embodiment, the outer cylindrical sleeve may be formed by rolling sheet stock material around the outer diameter surface of the inner cylindrical sleeve and joining the sheet material to the outer cylindrical sleeve through a welding or brazing process. The ends of the sheet stock may also be coated and joined together to form a seam on the outer diameter surface of the inner cylindrical sleeve through the same welding or brazing process. The outer, tube shaped member may also be formed by a plating process such as electrochemical deposition or plasma spray. The inner cylindrical sleeve may be formed in similar ways using a cladding material of a different material composition than the outer cylindrical sleeve. The inner cladding may also be formed from a plating process such as electrochemical deposition or plasma spray. The primary considerations for forming the cladding layer on the inner diameter surface of the outer cylindrical sleeve is to provide a surface which prevents ice particles from adhering to the surface of the tube and to allow smooth relative motion between the whip rod or other mechanical agitation means positioned in the heat exchanger tube.

In another embodiment of the invention, a third material may be used between the inner and outer sleeves of the heat exchanger tube to lower thermal resistance between the outer and inner sleeves. The third material may be a thermal mastic or grease that is applied to the surfaces of one of the sleeves of the heat exchanger tube. During the process of drawing the inner and outer sleeve into the heat exchanger tube, a layer of grease or thermal mastic is placed between the contact surfaces of the inner and outer sleeves. The grease or thermal mastic excludes air and reduces the contact resistance to heat transfer between the inner and outer sleeves. Excess grease or mastic may then be extruded out of the tube as the tube is pulled though the draw bench. The third material may also be a brazing material or solder. A brazing material or solder material forms a metallurgical bond between inner and outer sleeves after the tube is heated to the proper temperature. The metallurgical bond also reduces thermal resistance between the inner and outer sleeves of the heat exchanger tube. Although use of the third material is more costly when compared to the previously described draw operation which produces the mechanical interference fit, the third material increases the integrity of the heat exchanger tube and decreases the thermal resistance between the inner and outer sleeves, as may be desired in some applications.

Although the embodiments of the present invention have been described with reference to an orbital whip rod heat exchanger, it should be understood that the present invention may be applied to various other heat exchangers used to chill feed solutions flowing through the interior of a heat exchanger tube. This invention may also be applied to other heat exchangers that use scouring blades in a cylindrical chamber to produce a pumpable ice-water mixture.

As various changes could be made in the above construction without departing from the scope of the invention, it is intended that all matter contained in the above description and shown in the accompanying drawings shall be interpreted as illustrative and not in any limiting sense. The invention therefore shall solely be limited by the scope of the claims set forth below, and their legal equivalents.

What is claimed is:

1. A heat exchanger tube for a heat exchanger in an ice slurry generating the heat exchanger tube comprising:

a first, inner surface made from a first material composition, and a second outer surface made from a second material composition, the first material composition being different than the second material composition and having a lower galvanic potential compared to drive components of the ice slurry generating machine when the heat exchanger tube is installed in the ice slurry generating machine and a feed solution flows through the heat exchanger tube inner surface, thereby reducing wear of the ice slurry generating machine drive components.

2. The heat exchanger tube of claim 1, wherein:

the tube is comprised of two concentric sleeves.

3. The heat exchanger tube of claim 2, wherein:

the tube is formed by drawing an outer sleeve over an inner sleeve.

4. The heat exchanger tube of claim 2, wherein:

the tube is comprised of an outer sleeve over an inner sleeve.

5. The heat exchanger tube of claim 2, wherein:

the sleeves are interference fit to each other.

6. The heat exchanger tube of claim 2, wherein:

substantially the entirety of the inner sleeve is surrounded by the outer sleeve.

7. The heat exchanger tube of claim 2, wherein:

,substantially the entirety of the adjacent sleeve surfaces are in physical contact.

8. The heat exchanger tube of claim 2, wherein:

the inner surface of the inner sleeve is substantially seamless.

9. The heat exchanger tube of claim 2, wherein:

the tube, has a third material interposed among the inner and outer sleeves, the third material bonds the inner and outer sleeves together.

10. The heat exchanger tube of claim 2, wherein:

the tube has a third material interposed between the inner and outer sleeves, the third material is a thermal mastic.

11. The heat exchanger tube of claim 2, wherein:

the first material composition is a copper based material.

12. The heat exchanger tube of claim 2, wherein:

the second material composition is one from the group consisting of carbon steel, austenitic stainless steel, martensitic stainless steel, and aluminum.

13. A method for decreasing wear of drive components in an orbital rod heat exchanger, the method comprising:

providing a heat exchanger tube with an inner portion of the heat exchanger tube formed from a first material composition and an outer portion of the heat exchanger tube formed from a second material composition, the first material composition being the different from the second material composition whereby the inner portion is in contact with a feed solution flowing through the heat exchanger tube and the inner portion has a lower galvanic potential compared to the drive components when in the presence of the feed solution.

14. The method of claim 13, wherein:

the first material composition is a copper-based material.

15. The method of claim 13, wherein:

the second material composition is one from the group consisting of carbon steel, austenitic stainless steel, martensitic stainless steel, and aluminum.

* * * * *